United States Patent
Bowers et al.

[11] Patent Number: 6,155,599
[45] Date of Patent: Dec. 5, 2000

[54] RETAINING RING WITH GAS DIFFUSER

[75] Inventors: Paul A. Bowers, Ray, Mich.; Timothy A. Swann, Mesa, Ariz.

[73] Assignees: TRW Vehicle Safety Systems Inc.; TRW Inc., both of Lyndhurst, Ohio

[21] Appl. No.: 09/132,317

[22] Filed: Aug. 11, 1998

[51] Int. Cl.[7] .................................................. B60R 21/28
[52] U.S. Cl. .................................... 280/740; 280/728.2
[58] Field of Search .................................. 280/736, 740, 280/741, 742, 728.2

[56] References Cited

U.S. PATENT DOCUMENTS

| | | |
|---|---|---|
| 3,797,853 | 3/1974 | Grosch et al. . |
| 4,013,305 | 3/1977 | Ichihara ............................ 280/740 X |
| 4,830,401 | 5/1989 | Honda . |
| 4,902,036 | 2/1990 | Zander et al. . |
| 5,018,762 | 5/1991 | Suzuki et al. . |
| 5,199,741 | 4/1993 | Swann et al. ........................... 280/740 |
| 5,246,249 | 9/1993 | Satoh . |
| 5,344,186 | 9/1994 | Bergerson et al. ................. 260/736 X |
| 5,378,011 | 1/1995 | Rogerson et al. . |
| 5,609,360 | 3/1997 | Faigle et al. ........................... 280/740 |
| 5,762,360 | 6/1998 | Damman et al. .................. 280/740 X |
| 5,826,901 | 10/1998 | Adomeit ............................ 280/728.2 |
| 5,860,672 | 1/1999 | Petersen ............................ 280/728.2 |
| 5,897,133 | 4/1999 | Papandreou ....................... 280/728.2 |
| 5,992,874 | 11/1999 | Sugiyama et al. ................... 280/728.2 |
| 6,017,054 | 1/2000 | Magoteaux .......................... 280/728.2 |

FOREIGN PATENT DOCUMENTS 3604843  8/1987  Germany .

Primary Examiner—Brian L. Johnson
Assistant Examiner—Bryan Fischmann
Attorney, Agent, or Firm—Tarolli, Sundheim, Covell, Tummino & Szabo L.L.P.

[57] ABSTRACT

An apparatus (10) comprises an inflatable vehicle occupant protection device (12) and an actuatable inflator (14) for, when actuated, providing inflation fluid to inflate the inflatable vehicle occupant protection device. A retaining ring (16) is attached to the inflatable vehicle occupant protection device (12). The retaining ring (16) encircles the inflator (14) and defines an annular chamber (88) disposed radially outward of a plurality of outlet openings (26) in the inflator (14). The retaining ring (16) includes a circumferentially spaced plurality of exit ports (90) in fluid communication with the annular chamber (88). The annular chamber (88) and the exit ports (90) redirect the inflation fluid flowing out of the outlet openings (26) into the inflatable vehicle occupant protection device (12). The inflation fluid is thus prevented from impinging directly on an inner surface (50) of the inflatable occupant protection device as the inflation fluid is being directed out of the inflator (14).

9 Claims, 3 Drawing Sheets

RETAINING RING WITH GAS DIFFUSER

TECHNICAL FIELD

The present invention relates to a vehicle safety apparatus comprising an inflatable vehicle occupant protection device, an inflator, and a retaining ring. In particular, the present invention relates to an air bag module including a retaining ring which retains an inflatable vehicle occupant protection device, such as an air bag, and which also directs inflation gas from an inflator into the inflatable vehicle occupant protection device.

BACKGROUND OF THE INVENTION

An air bag module for use in a vehicle typically includes an inflatable air bag and an actuatable inflator for providing inflation fluid to inflate the air bag. The typical air bag module also includes a retaining ring which secures a mouth section of the air bag about the inflator.

In the event of sudden vehicle deceleration, such as occurs in a vehicle collision, the inflator is actuated to direct inflation fluid under pressure into the air bag to help protect a vehicle occupant from injury. The inflation fluid which flows from the inflator may include high temperature gases and particulate matter which may cause damage to the material of the air bag. Hence, it is desirable to prevent the inflation fluid from impinging directly on the air bag immediately upon exiting the inflator.

SUMMARY OF THE INVENTION

The present invention is an apparatus for use in a vehicle. The apparatus comprises an inflatable vehicle occupant protection device having inner and outer surfaces and an actuatable inflator for, when actuated, providing inflation fluid to inflate the inflatable vehicle occupant protection device. The inflator includes a circumferentially spaced plurality of outlet openings which are located inside the inflatable vehicle occupant protection device and through which inflation fluid is directed out of the inflator. A retaining ring is attached to the inflatable vehicle occupant protection device. The retaining ring encircles the inflator and defines an annular chamber disposed radially outward of the plurality of diffuser openings in the inflator. The retaining ring includes a circumferentially spaced plurality of exit ports in fluid communication with the annular chamber. The annular chamber and the exit ports, when the inflator is actuated, redirect the inflation fluid flowing out of the outlet openings into the inflatable vehicle occupant protection device. The inflation fluid is thereby prevented from impinging directly on the inner surface of the inflatable vehicle occupant protection device as the inflation fluid is being directed out of the inflator.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
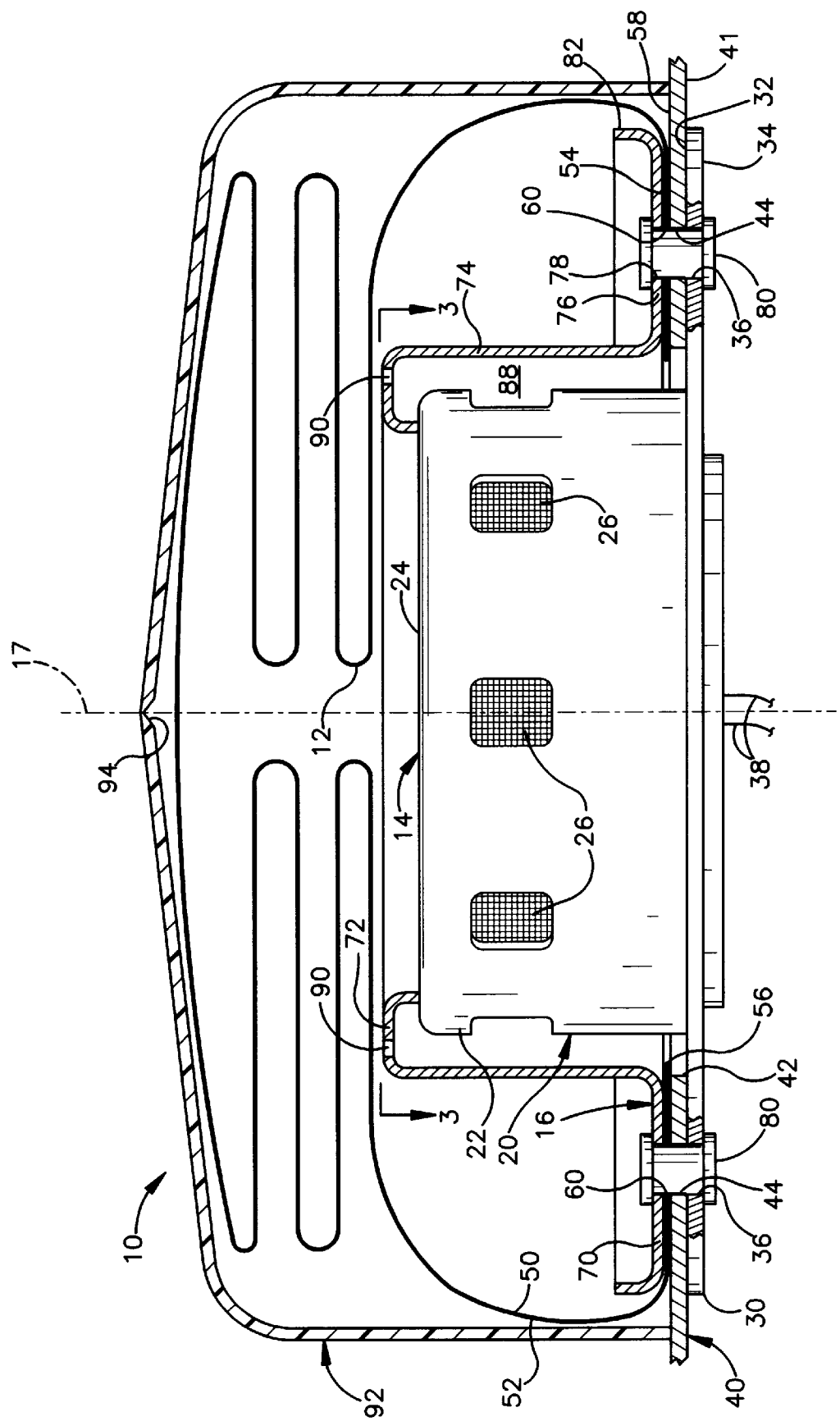
FIG. 1 is a schematic view, partially in section, of an air bag module constructed in accordance with the present invention.

The present invention relates to a vehicle safety apparatus including an inflatable vehicle occupant protection device for helping to protect a vehicle occupant in the event of a vehicle collision. The present invention is applicable to various vehicle safety apparatus constructions. As representative of the present invention, FIG. 1 illustrates a vehicle safety apparatus or air bag module 10. The air bag module 10 includes an inflatable vehicle occupant protection device or air bag 12, an air bag inflator 14, and an air bag retaining ring 16.

The inflator 14 is illustrated as a driver-side inflator and comprises a source of inflation fluid for inflating the air bag 12. As is known in the art, the inflator 14 contains an ignitable gas generating material which, when ignited, rapidly produces a volume of gas to inflate the air bag 12. Alternatively, the inflator 14 could contain a stored quantity of pressurized inflation fluid, or could contain a combination of pressurized inflation fluid and ignitable material for heating the pressurized inflation fluid.

The inflator 14 has a central axis 17 and includes a cylindrical housing 20. The housing 20 has a cylindrical outer surface 22 extending parallel to the central axis 17 and a radially extending end surface 24. A circumferentially spaced plurality of outlet openings 26 are formed in the housing 20 for directing inflation fluid out of the inflator 14 toward the air bag 12. The outlet openings 26 are preferably identical in size and spaced equally apart, but could alternatively be of various sizes and/or spaced unequally apart.

A mounting flange 30 projects radially outward from a lower (as viewed in FIG. 1) end of the inflator 14. The mounting flange 30 has parallel upper and lower surfaces 32 and 34, respectively, and a circumferentially spaced plurality of fastener openings 36. A pair of lead wires 38 project axially from the lower end of the inflator 14 and are electrically connected to vehicle circuitry (not shown) for actuating the inflator, as is known in the art.

The upper surface 32 of the mounting flange 30 of the inflator 14 abuts a lower surface 41 of a mounting plate 40 attached to the vehicle steering wheel in a manner not shown. The mounting plate 40 has a central opening 42 for receiving the housing 20 of the inflator 14. A circumferentially spaced plurality of fastener holes 44 are formed in the mounting plate 40. Each fastener hole 44 aligns with a respective one of the plurality of fastener openings 36 in the mounting flange 30 of the inflator 14.

The air bag 12 (illustrated schematically by a single line in FIG. 1) is made from two panels of a fabric material, such as woven nylon. The air bag 12 has inner and outer surfaces 50 and 52, respectively. A mouth portion 54 of the air bag 12 adjoins the mounting plate 40. The mouth portion 54 includes a central opening 56 through which the housing 20 of the inflator 14 extends. The outer surface 52 in the mouth portion 54 of the air bag 12 abuts an upper surface 58 of the mounting plate 40. A circumferentially spaced plurality of clearance holes 60 are located in the mouth portion 54 of the air bag 12. Each of the clearance holes 60 aligns with a respective one of the fastener openings 36 in the mounting flange 30 of the inflator 12 and with a respective one of the fastener holes 44 in the mounting plate 40.

The retaining ring 16, which is made of metal, is generally circular in shape and circumscribes the inflator 14. The retaining ring 16 could alternatively have a generally rectangular shape. When viewed in cross-section, the retaining ring 16 has oppositely disposed first and second end portions 70 and 72, respectively, connected by a main body portion 74. The main body portion 74 extends axially parallel to, but spaced radially from, the outer surface 22 of the housing 20 of the inflator 14.

The first end portion 70 of the retaining ring 16 has a first part 76 which extends radially outward from the main body portion 74 and which overlies the mouth portion 54 of the air bag 12. The first part 76 includes a circumferentially spaced plurality of fastener apertures 78 located so as to align with the clearance holes 60 in the air bag 12, the fastener openings 36 in the mounting flange 30 of the inflator 14, and the fastener holes 44 in the mounting plate 40. A plurality of fasteners 80, illustrated as rivets in FIG. 1, extend axially through the aligned holes/openings 78, 60, 44 and 36 in the retaining ring 16, the air bag 12, the mounting plate 40, and the inflator mounting flange 30, respectively. The fasteners 80 clamp the mouth portion 54 of the air bag 12 between the first end portion 70 of the retaining ring 16 and the mounting plate 40 to secure the air bag 12 in the air bag module 10. A second part 82 of the first end portion 70 of the retaining ring 16 extends axially from the first part 76 away from the mouth portion 54 of the air bag 12 and the mounting plate 40 underneath the mouth portion.

The second end portion 72 of the retaining ring 16 projects axially beyond the housing 20 of the inflator 14. The second end portion 72 has a first section 84 (FIG. 2) extending radially inward from the main body portion 74 of the retaining ring 16 and a second section 86 extending axially from the first section 84 into contact with the end surface 24 of the housing 20. The second end portion 72 and the main body portion 74 of the retaining ring 16 together define an annular chamber 88 disposed radially outward of the plurality of diffuser openings 26 in the inflator 12.

The first section 84 of the second end portion 72 of the retaining ring 16 includes a circumferentially spaced plurality of exit ports 90. In accordance with a preferred embodiment of the invention, the exit ports 90 are spaced equally apart, are identical in diameter, and extend in the axial direction.

The air bag module 10 further includes a cover 92 which covers the folded air bag 12 and the inflator 14. The cover 92 is secured to the mounting plate 40 in a manner not shown. The cover 92 has a tear seam 94 at which the cover will tear to allow the air bag 12 to deploy after actuation of the inflator 14.

In the event of sudden vehicle deceleration such as occurs in a vehicle collision, the inflator 14 is actuated in a known manner to produce and release inflation fluid in the form of gas to inflate the air bag 12. Depending on the design of the inflator 14, the gas produced by the inflator may exit the inflator at a relatively high temperature. Further, the gas may contain particulate matter resulting from the combustion of pyrotechnic materials inside the inflator 14. Such particulate matter carried by the gas may also exit the inflator 14 at a relatively high temperature.

The gas produced by the actuated inflator 14 is directed out of the inflator through the outlet openings 26 in the housing 20. The gas thus leaves the inflator 14 flowing in a radially outward direction through the outlet openings 26. After the gas passes through the outlet openings 26, the gas enters the annular chamber 88 which surrounds the housing 20 and which is defined by the retaining ring 16. The gas flowing out of the outlet openings 26 impinges directly on the main body portion 74 of the retaining ring 16 located immediately radially outward of the diffuser openings.

The inflation gas in the annular chamber 88 is then redirected by the retaining ring 16 to flow out of the annular chamber through the exit ports 90 in the second end portion 72 of the retaining ring. The gas flows axially through the exit ports 90 in the retaining ring 16 and into the folded air bag 12, which is located between the inflator 14 and the cover 92, to inflate the air bag. The inflation of the air bag 12 causes the tear seam 94 in the cover to rupture under the force of the expanding air bag so that the air bag can fully deploy into the passenger compartment of the vehicle.

The configuration of the retaining ring 16 provides an additional leg in the flow path of the inflation gas into the air bag 12. This additional leg which is formed by the retaining ring 16 prevents the gas from impinging directly on the inner surface 50 of the air bag 12 as the gas exits the inflator 14. Further, the flow of the gas through the annular chamber 88 and the exit ports 90 reduces the velocity and temperature of the gas entering the air bag 12. The annular chamber 88 also serves as a collector for particulate matter in the gas which precipitates out of the gas or plates out of the gas onto the retaining ring 16 as the gas flows through the annular chamber.

Figure 4:
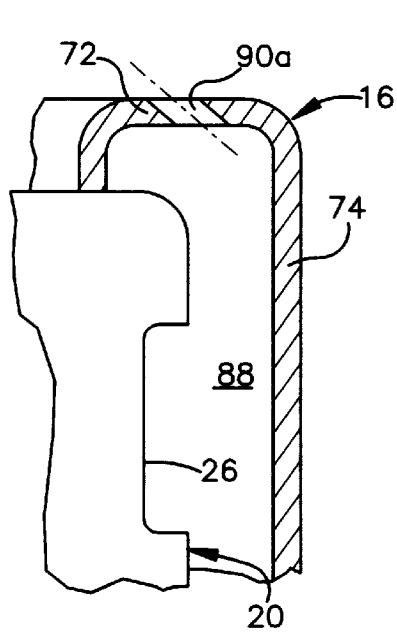
FIG. 4 is a view similar to FIG. 2 illustrating an alternate embodiment of the present invention.

FIG. 4 illustrates an alternate embodiment of the present invention in which a plurality of exit ports 90a in the second end portion 72 of the retaining ring 16 extend at an angle relative to the main body portion 74 of the retaining ring. As shown in FIG. 4, the exits ports 90a do not extend axially as in the prior embodiment, but instead are angled radially inward to direct the gas flow toward the central axis 17 of the inflator 14.

Figure 2:
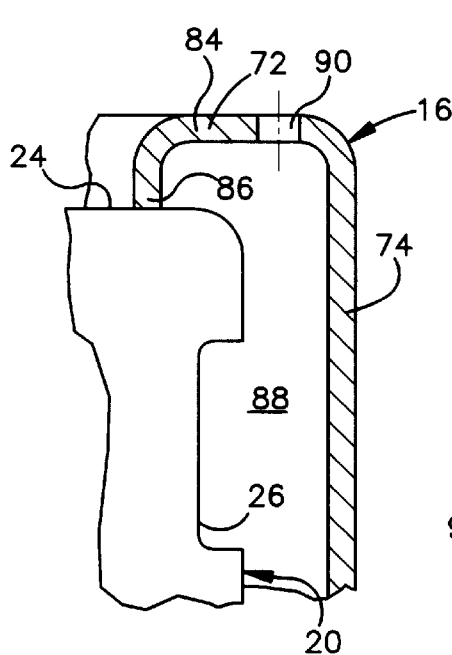
FIG. 2 is an enlarged view of a portion of the air bag module of FIG. 1.
Figure 3:
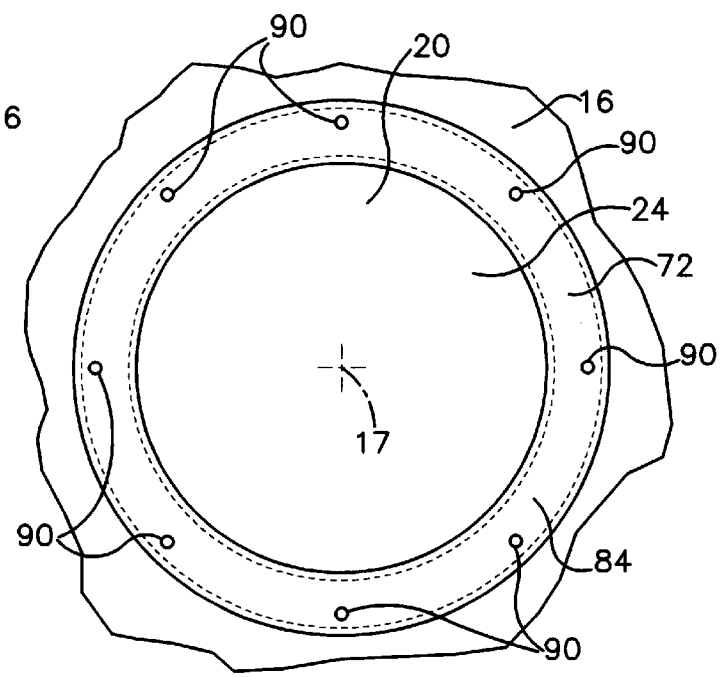
FIG. 3 is a view taken along line 3-3 in FIG. 1.
Figure 5:
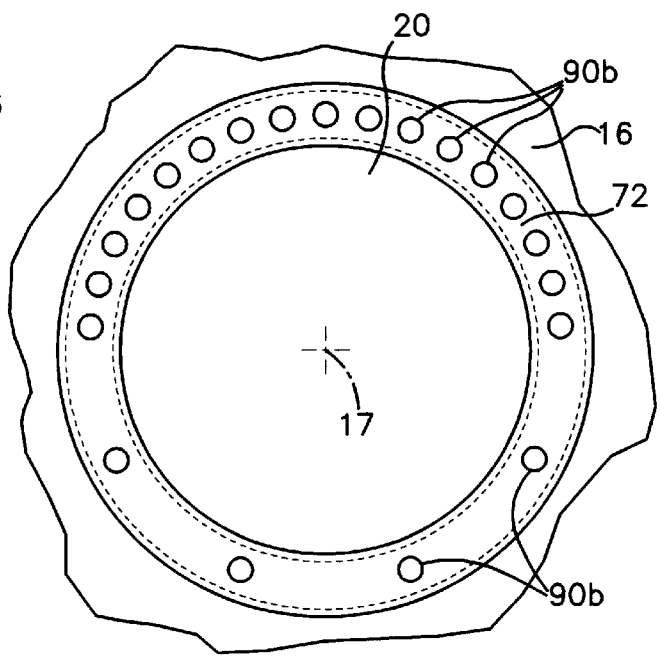
FIG. 5 is a view similar to FIG. 3 illustrating another alternate embodiment of the present invention.

FIG. 5 illustrates another alternate embodiment of the present invention in which a plurality of exit ports 90b in the second end portion 72 of the retaining ring 16 are not equally spaced apart, as with the embodiment of FIGS. 1–3. Instead, in the embodiment of FIG. 5, the exit ports 90b are spaced unevenly about the retaining ring 16, with a majority of the exit ports 90b being located on one half of the retaining ring. This configuration of the exit ports 90b in the retaining ring 16 directs a larger volume of the gas flow into a given portion of the air bag 12.

Figure 6:
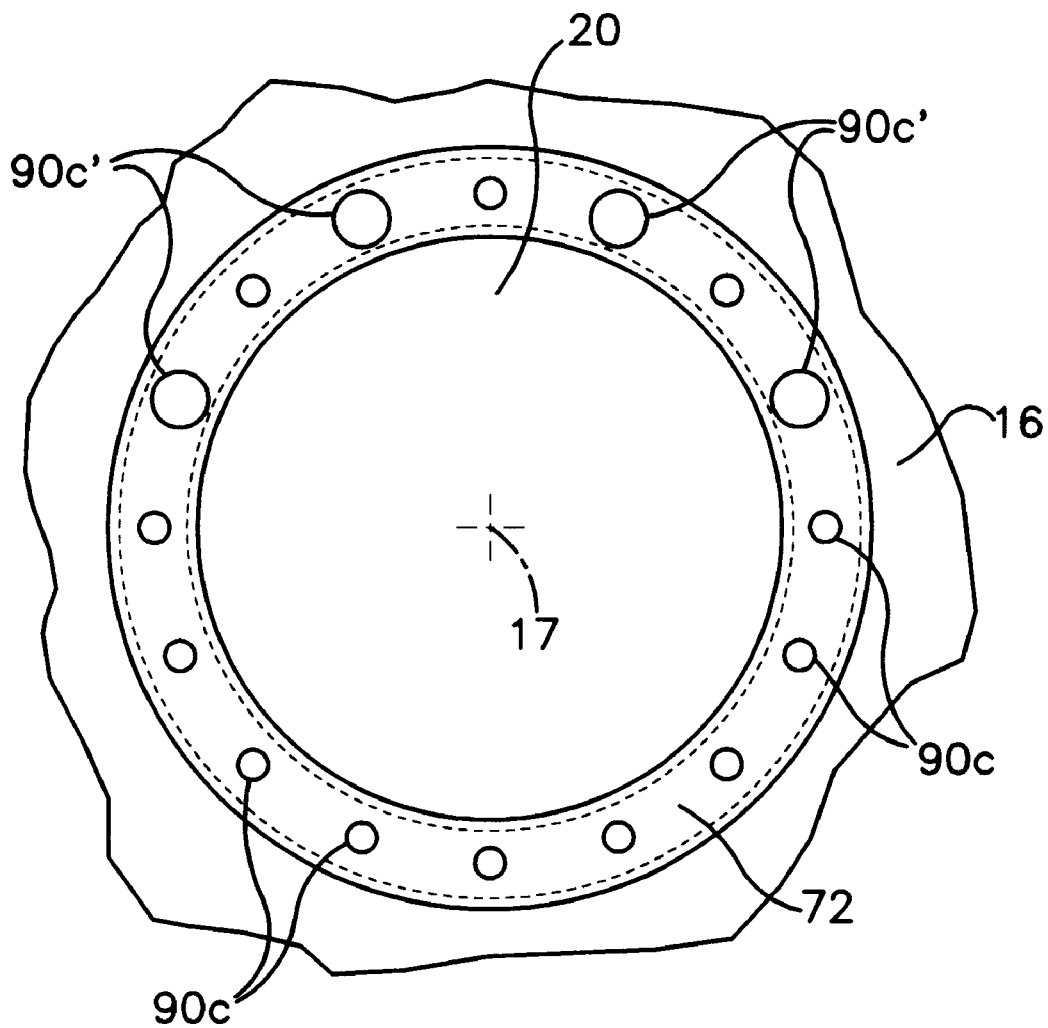
FIG. 6 is a view similar to FIG. 5 illustrating yet another alternate embodiment of the present invention.

FIG. 6 illustrates yet another alternate embodiment of the present invention in which a plurality of exit ports 90c in the second end portion 72 of the retaining ring 16 are not identical in size, as with the embodiment of FIGS. 1–3. Instead, in the embodiment of FIG. 6, a portion 90c' of the exit ports 90c located on one half of the retaining ring 16 have a larger diameter than the rest of the exit ports. This configuration of the exit ports 90c in the retaining ring 16 functions similar to the embodiment of FIG. 5 in that it directs a larger volume of the gas flow into a given portion of the air bag 12.

From the above description of the invention, those skilled in the art will perceive improvements, changes and modifications. For example, screens and/or filters could be placed in the annular chamber 88 to cool or filter the inflation fluid further prior to entry into the air bag 12. Such improvements, changes and modifications within the skill of the art are intended to be covered by the appended claims.

Having described the invention, we claim:

1. An apparatus for use in a vehicle, said apparatus comprising:

an inflatable vehicle occupant protection device having inner and outer surfaces;

an actuatable inflator for, when actuated, providing inflation fluid to inflate said inflatable vehicle occupant protection device, said inflator including a circumferentially spaced plurality of outlet openings which are located inside said inflatable vehicle occupant protection device and through which inflation fluid is directed out of said inflator; and a retaining ring attached to said inflatable vehicle occupant protection device, said retaining ring encircling said inflator and defining an annular chamber disposed radially outward of said plurality of diffuser openings in said inflator, said retaining ring including a circumferentially spaced plurality of exit ports in fluid communication with said annular chamber, said annular chamber and said exit ports, when said inflator is actuated, redirecting the inflation fluid flowing out of said outlet openings into said inflatable vehicle occupant protection device to prevent the inflation fluid from impinging directly on said inner surface of said inflatable vehicle occupant protection device as the inflation fluid is being directed out of said inflator;

said retaining ring having first and second end portions connected by an axially extending main body portion, said first end portion of said retaining ring having a first part extending radially outward from said main body portion and overlying a mouth portion of said inflatable vehicle occupant protection device;

said mouth portion of said inflatable vehicle occupant protection device being secured to said first part of said first portion of said retaining ring and to a mounting flange of said inflator by a circumferentially spaced plurality of fasteners, said second end portion of said retaining ring projecting axially beyond said inflator, said second end portion having a first section extending radially inward from said main body portion and a second section extending axially from said first section toward said inflator.

2. The apparatus of claim 1 wherein said second section of said second end portion of said retaining ring abuts an outer surface of said inflator.

3. The apparatus of claim 1 wherein said plurality of exit ports are located in said first section of said second end portion of said retaining ring.

4. The apparatus of claim 3 wherein said plurality of exit ports in said retaining ring extend parallel to said main body portion of said retaining ring.

5. The apparatus of claim 3 wherein said plurality of exits ports in said retaining ring extend at an angle relative to said main body portion of said retaining ring.

6. The apparatus of claim 3 wherein said plurality of exit ports in said retaining ring are spaced equally apart.

7. The apparatus of claim 3 wherein said plurality of exit ports in said retaining ring are spaced unequally apart.

8. The apparatus of claim 3 wherein said plurality of exit ports in said retaining ring are identical in diameter.

9. The apparatus of claim 3 wherein said plurality of exit ports in said retaining ring have different diameters.

* * * * *